United States Patent
Bassani

(10) Patent No.: US 6,463,641 B2
(45) Date of Patent: Oct. 15, 2002

(54) MOTORCYCLE EXHAUST SYSTEM

(76) Inventor: Darryl C. Bassani, 5729 Grandview, Yorba Linda, CA (US) 92886

( * ) Notice: Subject to any disclaimer, the term of this patent is extended or adjusted under 35 U.S.C. 154(b) by 0 days.

(21) Appl. No.: 09/882,102

(22) Filed: Jun. 15, 2001

(65) Prior Publication Data

US 2001/0045092 A1 Nov. 29, 2001

Related U.S. Application Data

(62) Division of application No. 09/413,951, filed on Oct. 7, 1999, now Pat. No. 6,247,305.

(51) Int. Cl.[7] .............................................. B21D 51/16
(52) U.S. Cl. ......................... 27/890.08; 60/312; 60/313; 60/322; 60/274; 181/227
(58) Field of Search ........................ 29/890.08; 60/312, 60/313, 314, 322, 323, 305, 274; 181/227, 228

(56) References Cited

U.S. PATENT DOCUMENTS

| | | | | |
|---|---|---|---|---|
| D182,135 S | * | 2/1958 | Maynard et al. | |
| D214,037 S | * | 5/1969 | Flugger | |
| D255,112 S | * | 5/1980 | Alexander | |
| 4,342,195 A | * | 8/1982 | Lo | |
| 4,359,865 A | | 11/1982 | Nakao et al. | |
| 4,621,494 A | | 11/1986 | Fujita | |
| 4,831,823 A | | 5/1989 | Ueda | |
| 4,860,538 A | | 8/1989 | Takeuchi | |
| 4,926,634 A | * | 5/1990 | Putz et al. | |
| 4,947,645 A | * | 8/1990 | Pemberton | |
| 5,144,799 A | * | 9/1992 | Barth | |
| 5,148,597 A | * | 9/1992 | Weeks | |
| 5,216,883 A | * | 6/1993 | Flugger | |
| D406,593 S | * | 3/1999 | Bittle | |

* cited by examiner

Primary Examiner—David P. Bryant
Assistant Examiner—T. Nguyen
(74) Attorney, Agent, or Firm—Knobbe, Martens, Olson & Bear LLP

(57) ABSTRACT

A method of manufacturing a exhaust system for an internal combustion engine having two banks of cylinders by which pulses of exhaust gas are alternately directed to a crossfire assembly. The crossfire assembly, which is located in the exhaust system, includes a gas accelerator chamber which divides each pulse of exhaust gas between two secondary exhaust outlets and causes a low pressure wave to occur in the exhaust system to enhance scavenging of a subsequent pulse of exhaust gas and thereby improve engine performance.

12 Claims, 12 Drawing Sheets

MOTORCYCLE EXHAUST SYSTEM

RELATED APPLICATION

This application is a divisional application of U.S. application Ser. No. 09/413,951, filed Oct. 7, 1999 now U.S. Pat. No. 6,247,305.

BACKGROUND OF THE INVENTION

FIELD OF THE INVENTION

This invention relates generally exhaust systems. More particularly, the invention relates to an exhaust system for a multi-cylinder internal combustion engine.

BACKGROUND

Motorcycles commonly employ exhaust systems to convey the exhaust gas from the engine's cylinder to the ambient environment. The journey begins at the engine cylinder, which incorporates intake and exhaust ports for ingress and egress to the cylinder. Fresh air mixed with fuel enters the engine cylinder through the intake port where it is subsequently compressed by a piston and ignited. A rapid expansion of the compressed fuel and air occurs, thereby forcefully moving the piston in the opposite direction to the compression stroke. Once the expansion is complete, the exhaust port opens to allow the combustion by-products or gas to exit the engine cylinder and enter an exhaust pipe. The exhaust port may be a passageway into the engine cylinder that is uncovered by the retreating piston, as in a two-stroke design well known in the art. In the case of a four-stroke design, a valve is utilized to open or close the exhaust port. The exhaust gas expelled from the engine cylinder, after passing through the exhaust port, enters an exhaust pipe. The exhaust pipe is designed to direct the exhaust gas towards the rear of the motorcycle and commonly utilizes bends and curves to accomplish this goal.

In a single cylinder engine, the exhaust gas, after passing through the exhaust pipe, is typically fed into a muffler prior to its expulsion into the atmosphere to dissipate unwanted noise originating in the combustion process. The exhaust system may also include a catalytic converter or other exhaust treatment device well known in the art. The muffler design will significantly affect the audible noise level or sound of the engine. A manufacturer can attenuate or change the sound of the engine so as to not only meet governmental noise requirements but also for the engine to exhibit a pleasing sound to the ear.

Depending on the design of the exhaust system, including the muffler and exhaust pipe, back pressure will be introduced, which impedes the free flow of exhaust gases along the exhaust system's entire length. For example, in a four-stroke engine, the piston pushes the exhaust gases out of the cylinder and into the exhaust system. If the back pressure in the exhaust system is reduced, the piston requires less force to expel the exhaust gases from the engine cylinder and thus increases the performance and efficiency of the engine. The performance of an engine is measured by the engine's generation of, for example, horsepower and torque over the entire rpm operating range. Generally, less back pressure will enhance the performance of the engine, or more specifically the engine's production of horsepower and torque while increasing its efficiency or reducing the engine's fuel consumption. However, a significant reduction in back pressure, which may be accomplished by, for example, using short exhaust pipes and no muffler, may have an adverse effect on engine noise and overall performance.

An exhaust system design that maximizes the horsepower of an engine will often have a deleterious effect on the engine's torque production over a portion of the RPM range. If this drop in torque is located in the middle of the RPM range, it may be noticeable as a momentary drop in acceleration to the rider or driver and be undesirable.

The overall length and shape of the exhaust system is an important factor in determining how the engine will operate and affect the performance of the engine. For example, with a multi-cylinder engine it is commonly preferred to have individual exhaust systems for each cylinder so as to prevent any flow turbulence caused by pulses of exhaust gas from different cylinders combining before being expelled to the atmosphere. However, individual exhaust systems may not be feasible when the engine has more than two cylinders due to cost, size, weight, and packaging limitations. This concern is especially acute for a motorcycle since the exhaust system needs to fit close to the motorcycle frame so that the rider and passenger can straddle the motorcycle and not be subjected to burns or the like caused by contact with the hot exhaust system. An automobile is less prone to the concern for unwanted contact with the exhaust system as the car's floorpan is a barrier between the exhaust system and the occupants. A motorcycle, in a similar fashion, can incorporate bodywork to enclose the exhaust system to further protect the rider/passenger from the hot exhaust system. This bodywork may also act as a sound barrier to reduce the noise associated with the exhaust system. For an automobile, the length of the exhaust system may be increased to help dampen out the engine noise originating in the combustion process, but this may not be well suited for a motorcycle due to a motorcycle's relatively short length as compared to an automobile.

The geometry or cross-sectional area of the exhaust system may also be varied along its length to vary the engine's performance. An ever-increasing cross-sectional area in the exhaust system will decrease the chance of causing a significant increase in back pressure. A constriction at any point in the exhaust system will have an impact on the velocity of the pulses of exhaust gas throughout the entire exhaust system. But as with the length and shape of the exhaust system, continually increasing the cross-section in the exhaust system is difficult to accomplish due to, for example, packaging and manufacturing concerns. A compromise is to incorporate step increases in the cross-section of the exhaust system along its entire length. For example, a step increase in the exhaust system's inside diameter may be incorporated at each exhaust system flange connection from the exhaust pipe to the muffler.

Exhaust systems are commonly routed along the sides or below the motorcycle depending on such design factors as, for example, the orientation of the engine cylinders with respect to one another, the orientation of the engine in the motorcycle frame, the preferred riding characteristics, the size of the motorcycle, and the location of the motorcycle's center of gravity. For example, a motorcycle with an engine inline with the frame can easily route its exhaust system along the sides of the motorcycle due to its narrow width. When the engine is transverse to the frame, there will be less available space to route the exhaust system along the sides of the frame due to the engine's increased width. In this case, the exhaust system may be routed below the engine and frame without increasing the overall width of the motorcycle. As a result of the many tradeoffs associated with the design of an exhaust system, a manufacturer will choose an exhaust system that presents a compromise between these characteristics for the consumer. As discussed above, these characteristics may include, for example, cost, size, weight, engine noise, performance, and packaging limitations.

Customization of exhaust components by motorcycle riders, such as exhaust pipes and mufflers, is common in the aftermarket. Customization allows the owner to re-optimize the characteristics of their vehicle so as to maximize their own satisfaction. A successful customization leads to not only personal satisfaction of accomplishment, but also a feeling of attachment to the vehicle. Often, the replacement of a component made by the original equipment manufacturer (OEM) with an aftermarket part does not live up to expectations and will not be easily reversible once it is completed. This can lead to the owner incurring additional costs to reverse the modification. For example, the addition of a force air induction system to an automobile often requires the cutting of a hole in the hood over an engine. If the owner decided the additional noise outweighed the performance increase, the purchase of a new hood would have to be absorbed to reverse the modification. In the case of exhaust systems, incorporation of aftermarket components often requires cutting and welding of the OEM exhaust system. Exhaust pipes or other parts of the exhaust system are often cut with subsequent welding being performed to incorporate the aftermarket component. Thus, the level of financial risk being taken by the owner and difficulty in reversing the modification are increased.

In the case of the liquid-cooled, horizontally opposed six-cylinder Honda Gold Wing® engine, the design of the stock OEM exhaust manifold affects the motorcycle's performance by causing a perceptible drop in torque near the middle of the engine's RPM range at top-gear speeds of between 50 and 75 mph. This drop in torque translates into less top-gear roll-on power which impacts the rider's ability to pass traffic at highway speeds with nothing more than the flick of the wrist. Except for this perceptible drop in torque, the Gold Wing's® smoothness and expansive torque make it one of the most rideable and satisfying machines on the market. Any potential aftermarket fix for this performance issue is further complicated by the Gold Wing's® OEM hidden exhaust system which is enclosed by an OEM shroud, thus impeding any modifications to the hidden exhaust system without permanent removal of the OEM shroud.

SUMMARY OF THE INVENTION

The preferred embodiment of the present invention is an exhaust system for a multi-cylinder motorcycle engine. The specific preferred embodiment described provides a substantial improvement to the well known Honda Gold Wing® engine. The aftermarket exhaust system constructed in recordance with the preferred embodiment of the invention comprises a plurality of primary exhaust pipes for dividing exhaust ports of the multi-cylinder engine into first and second groups. The first and second groups alternate in their discharge of a pulse of exhaust gas from the engine and feed the pulse of exhaust gas into a gas accelerator chamber which directs each alternating pulse of exhaust gas onto a flow splitter. The flow splitter, which is integral to the gas accelerator chamber and located obliquely to the direction of exhaust gas flow, distributes each pulse of exhaust gas between a first exhaust outlet and a second exhaust outlet forming a low-pressure zone in the wake of the pulse of exhaust gas. This low-pressure zone or wave travels back up the primary exhaust pipes for a different group of exhaust ports to draw in or accelerate the subsequent pulse of exhaust gas out of the next cylinder and down through the gas accelerator chamber. Thereby, scavenging of the pulse of exhaust gas from the engine cylinder is increased.

One significant feature of the preferred embodiment of this invention is that it provides the benefits of using a collector in an exhaust system, such as minimizing cost, weight and packaging while avoiding the possible interference between pulses of exhaust gases combining in the collector. Combining of the exhaust pipes can lead to an increase in back pressure and the corresponding drop in engine performance. However, in the present invention, the combination of pulses of exhaust gas increases the performance of the engine by enhancing scavenging. As a result, exhaust systems constructed in accordance with the preferred embodiment of this invention actually increase the exit velocity of the exhaust gas from the engine cylinder.

Another feature of the preferred embodiment of this invention is that each cylinder has substantially its own equal length exhaust pipe. This means each exhaust pipe is routed between the exhaust port and the collector such that all of the exhaust pipes have the same overall length. The exhaust pipes feed into a single collector. The benefit to using equal length exhaust pipes is that the pulses of exhaust gas will not arrive at the same time at the collector, which minimizes any interference between the pulses.

Still another feature of the preferred embodiment of the invention is that it emits a strong, throaty rumble typically preferred by rider of touring bikes typically prefer an exhaust system designed to emit, yet not so loud as to cause undue rider fatigue on a long road trip. In contrast, the OEM exhaust system for the Honda Gold Wing® was designed to minimize the exhaust sound of the motorcycle and presents a significant compromise to the owner of this powerful six-cylinder motorcycle sin an almost whisper quite engine does not audibly project the high level of performance associated with a powerful six-cylinder engine.

BRIEF DESCRIPTION OF THE DRAWINGS

The features, objectives, and advantages of the preferred embodiment of the invention will become more apparent from the detailed description set forth below when taken in conjunction with the drawings wherein like parts are identified with like reference numerals throughout, and wherein.

DETAILED DESCRIPTION OF THE INVENTION

Figure 1:
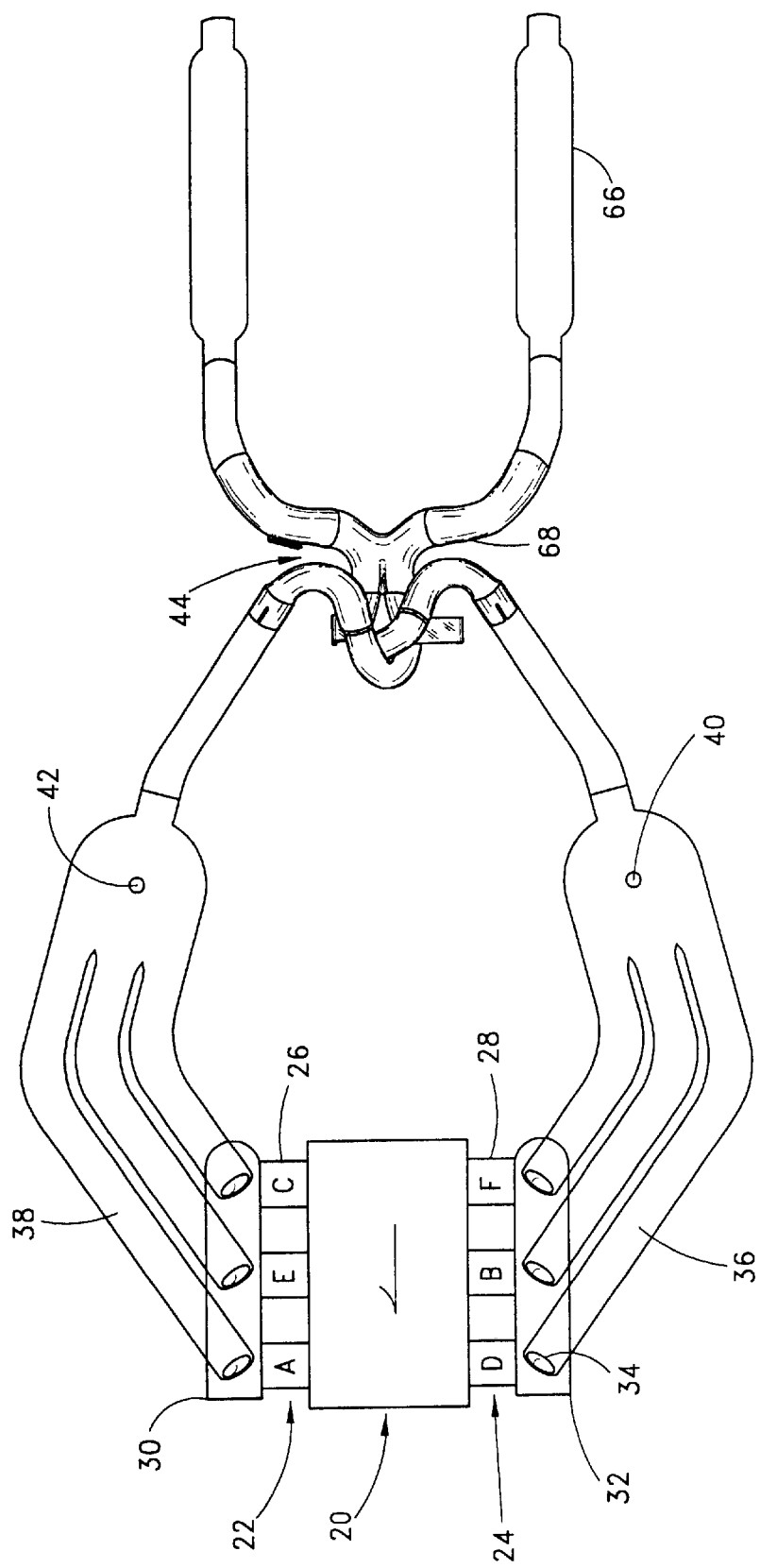
FIG. 1 is a top plan view showing an exhaust system according to a preferred embodiment of the invention.

FIG. 1 is a top plan view showing an exhaust system according to the preferred embodiment of the invention. An internal combustion engine 20 has two cylinder banks 22, 24 in an opposed arrangement. The two cylinder banks 22, 24 consist of a plurality of cylinders 26, 28, respectively. In the embodiment of the invention shown in FIG. 1, the two cylinder banks 22, 24 comprise three left and three right cylinders from the plurality of cylinders 26, 28. Each of the two cylinder banks 22, 24 have fixedly attached a cylinder head 30, 32 which forms a plurality of combustion chambers (not shown) within each plurality of cylinders 26, 28. Each cylinder head 30, 32 incorporates at least one of a plurality of intake ports (not shown) and at least one of a plurality of exhaust ports 34 for ingress and egress to the plurality of cylinders 26, 28. The intake ports are connected to an intake system (not shown) where fresh air mixed with fuel enters the plurality of engine cylinders 26, 28 where it is subsequently compressed by a plurality of pistons (not shown) into the plurality of combustion chambers (not shown) and ignited. A rapid expansion of the compressed fuel and air occurs, thereby forcefully moving the plurality of pistons in the opposite direction to the compression stroke.

The ignition of the compressed fuel and air occurs in an alternating sequence whereby one of the plurality of cylinders 26 transmits a pulse of exhaust gas followed by the transmission of another pulse of exhaust gas from one of the plurality of cylinders 28. In the embodiment shown in FIG. 1, this sequence is in the order of A-B-C-D-E-F and continually repeats during the operation of the internal combustion engine 20. Once the rapid expansion of the compressed fuel and air is complete, one of the plurality of exhaust ports 34, which is in flow communication with the ignited engine cylinder 26, 28, opens to allow the combustion by-products or pulse of gas to exit through the cylinder head 30, 32 and into a plurality of primary exhaust pipes 36, 38.

The plurality of primary exhaust pipes 36, 38 have a plurality of inlet ends (not shown) which are connected to the plurality of exhaust ports 34 to scavenge each pulse of exhaust gas from the plurality of engine cylinders 26, 28. Each of the primary exhaust pipes 36, 38 are configured to be in flow communication with each of the cylinders 26, 28 and are brought together into one of two collector chambers 40, 42 for each of the two cylinder heads 30, 32. Each of the two collector chambers 40, 42 is connected to and in flow communication with at least one outlet end (not shown) of each plurality of primary exhaust pipes 36, 38, wherein the two collector chambers 40, 42 alternate in their collection of subsequent discharges of the pulse of exhaust gas from the internal combustion engine 20. The two collector chambers 40, 42 are further connected to a crossfire assembly 44.

The use of the collector chambers 40, 42 has the benefits of, for example, minimizing cost, weight and packaging, but may be outweighed by the possible interference between pulses of exhaust gas combining in the collector chambers 40, 42. This combining of each plurality of primary exhaust pipes 36, 38 may lead to an increase in back pressure and the corresponding drop in engine performance. However, the combination of pulses of exhaust gas in the preferred embodiment of the present invention increases the performance of the internal combustion engine 20 by enhancing scavenging. Scavenging is the process of removing the exhaust gases from the cylinders. Scavenging may be enhanced or reduced by the collector chambers 40, 42 of the pulses of exhaust gas depending on the design of the exhaust system coupled with the design of the internal combustion engine 20. A properly scavenged engine will actually increase the exit velocity of the pulse of exhaust gas from the plurality of cylinders 26, 28. In a four-stroke engine, this reduces the force required by the piston to expel the pulse of exhaust gas from the plurality of cylinders 26, 28.

In another embodiment of the invention, the collector chambers 40, 42 may take the form of a series of Y connections (not shown) in an exhaust system. For example, in a four-cylinder engine four primary exhaust pipes (not shown) may be combined in pairs using two Y-collectors (not shown) and further combined with an additional Y-collector into a single exhaust pipe (not shown). For an eight-cylinder engine, this process would be mirrored for the opposite bank of four cylinders such that each bank would be combined using three Y-collectors into two exhaust pipes (not shown). The collector (not shown) may be placed anywhere in the exhaust system or incorporated in an exhaust system component which is well known in the art. For example, the collector could be located adjacent to where the gas leaves the exhaust ports of the cylinder or incorporated into the muffler (not shown).

In still another embodiment of the invention, the plurality of cylinders 26, 28 each have their own equal length primary exhaust pipe (not shown). This means each primary exhaust pipe 36, 38 is routed between the plurality of exhaust ports 34 and the collector chambers 40, 42 such that all of the plurality of primary exhaust pipes have the same overall length. Each plurality of primary exhaust pipes feeds into one of the two collector chambers 40, 42 as opposed to multiple Y-collectors as discussed above. The benefit to using equal length primary exhaust pipes is that the pulses of exhaust gas will not arrive at the same time at each of the collector chambers 40, 42, which minimizes any interference between the pulses.

Figure 2:
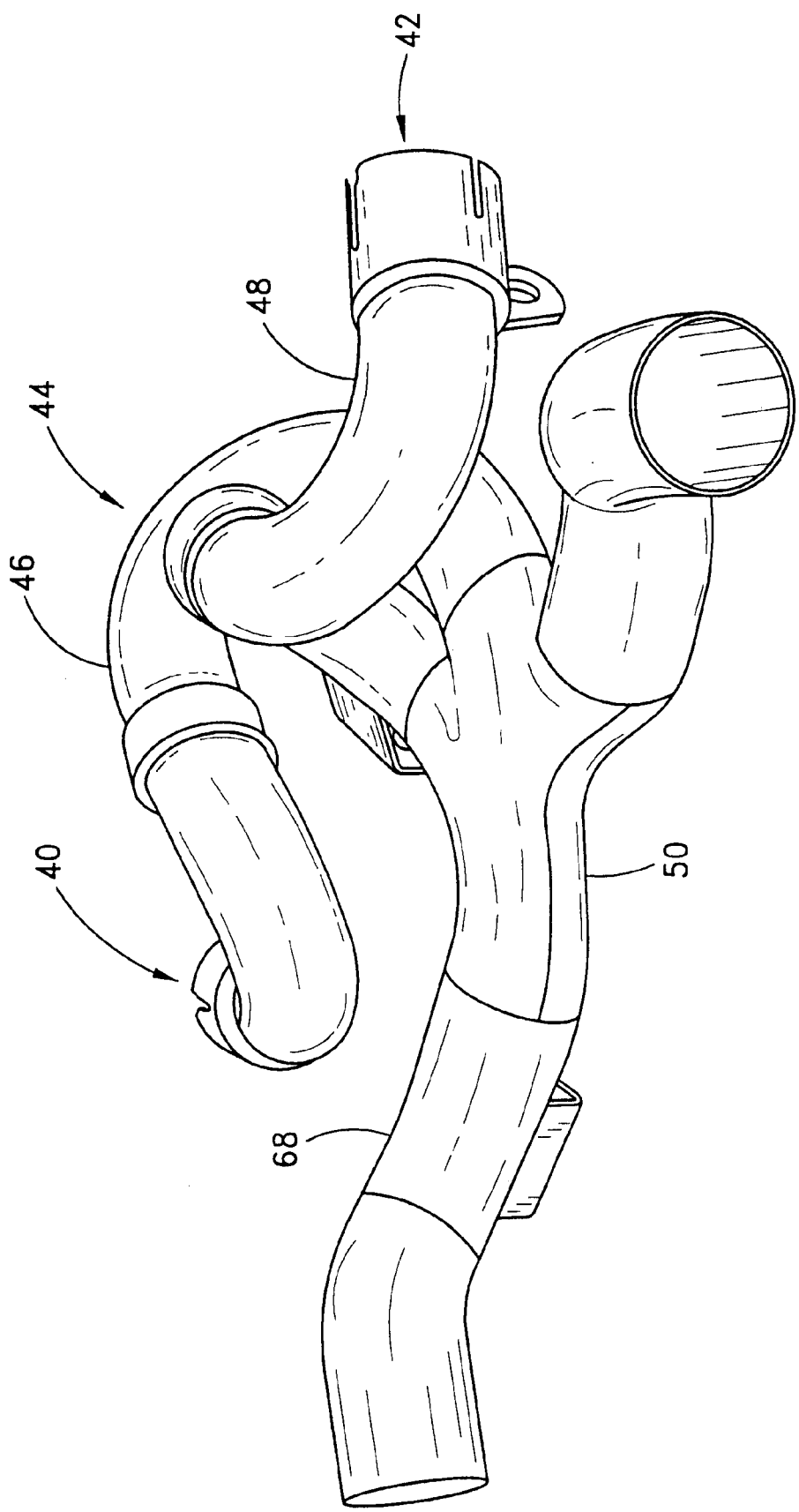
FIG. 2 is a perspective view of the crossfire assembly in accordance with the preferred embodiment of the invention.

The operation of the crossfire assembly 44 may be understood upon reference to FIG. 2, which is a perspective view of the crossfire assembly 44 in accordance with the invention. The crossfire assembly 44 receives the pulse of exhaust gas by way of two s-tube pipes 46, 48 each connected to and in flow communication with one of the two collector chambers 40, 42. The two s-tube pipes 46, 48 are each formed from a pair of approximately 180-degree elbow pipes (not shown) attached end to end in the shape of a non-coplanar "S" to form flow conduits between the two collector chambers 40, 42 and a gas accelerator chamber 50.

Figure 3:
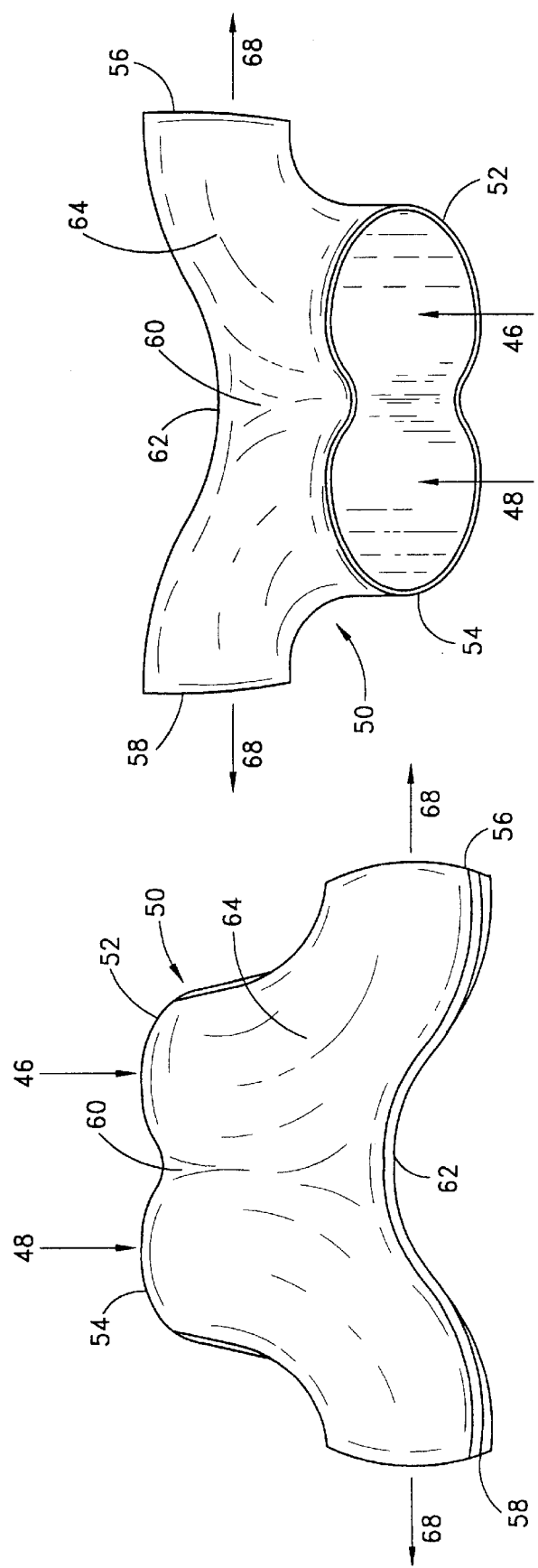
FIG. 3A is a top perspective view of the gas accelerator chamber that is a component of the crossfire assembly shown in FIG. 2.
FIG. 3B is a bottom perspective view of the gas accelerator chamber that is a component of the crossfire assembly shown in FIG. 2.

Referring to FIGS. 3A–3B, which are top and bottom perspective views of the gas accelerator chamber 50, respectively, that is a component of the crossfire assembly 44 shown in FIG. 2. Flow into and out of the gas accelerator chamber 50 is achieved by way of two exhaust inlets 52, 54 and two exhaust outlets 56, 58. The two exhaust inlets 52, 54 are formed by two overlapping circular shapes whereby their intersection forms two grooved surface depressions 60 which meld smoothly into the surface of the gas accelerator chamber 50. Exhaust inlet 52 is in flow communication with s-tube pipe 46; and exhaust inlet 54 is in flow communication with s-tube pipe 48. Crossing the two s-tube pipes 46, 48 (FIG. 2) increases the overall length of the flow path by an amount sufficient for the pulse of exhaust gas to dampen exhaust noise and further aligns the pulse of exhaust gas for its entrance into the gas accelerator chamber 50.

The exhaust inlets 52, 54 are aligned to direct the pulse of exhaust gas travelling from the two s-tube pipes 46, 48 onto a flow splitter 62 which may be integral to the gas accelerator chamber 50. The outer surface of the flow splitter 62 is primarily concave with the inner surface being primarily convex. The flow splitter 62 is located obliquely to the flow direction of the pulse of exhaust gas to divide each pulse of exhaust gas between the two exhaust outlets 56, 58. The two exhaust outlets 56, 58 direct each distributed pulse of exhaust gas away from the flow splitter 62 forming a low-pressure zone (not shown) in the wake of the pulse of exhaust gas. The low-pressure zone preferentially travels back up the exhaust system towards the plurality of exhaust ports 34 to scavenge the subsequent pulse of exhaust gas.

In one embodiment of the invention, the gas accelerator chamber 50 is fabricated by welding two similar upper and lower halves 64 together. In still another embodiment, the two exhaust inlets 52, 54 are formed by non-overlapping circular shapes designed to accept the two s-tube pipes 46, 48.

Each of the two exhaust outlets 56, 58 are in flow communication with a muffler 66 (FIG. 1) by way of two secondary exhaust pipes 68 (FIG. 3A–3B) so that the pulse of exhaust is expelled through both mufflers 66 (FIG. 1) to the atmosphere. In one preferred embodiment, the inside diameter of the two s-tube pipes 46, 48 (FIG. 2) is equal to or greater than the inside diameter of each of the primary exhaust pipes 36, 38 (FIG. 1) but less than or equal to the inside diameter of the two secondary exhaust pipes 68 (FIG. 1).

Figure 4:
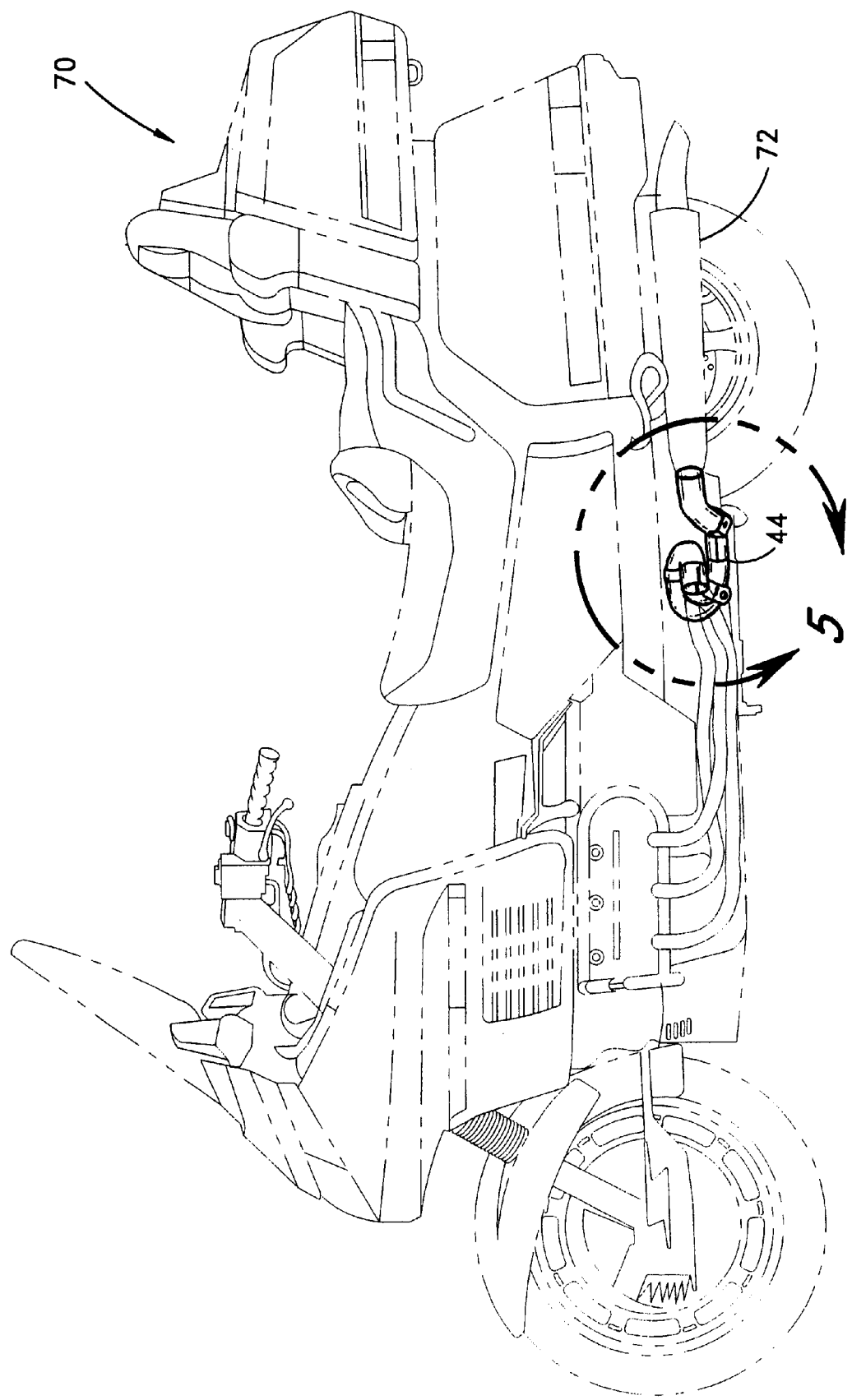
FIG. 4 is a side elevational view of one embodiment of the crossfire assembly incorporated into a motorcycle in accordance with the preferred embodiment of the invention.

In one preferred embodiment of the invention, as illustrated in FIG. 4, the Honda Gold Wing® motorcycle 70 is shown with the crossfire assembly 44 incorporated into Honda Gold Wing® OEM exhaust system. A feature of this preferred embodiment is that the OEM exhaust shroud (not shown) is retained so as to maintain the integrity of the OEM hidden exhaust system. The installation of the crossfire assembly 44 merely requires the translation of both OEM exhaust mufflers 72 approximately 1.5 inches towards the rear of the motorcycle. Such translation does not require any permanent modification to the Honda Gold Wing® 70.

Figure 5:
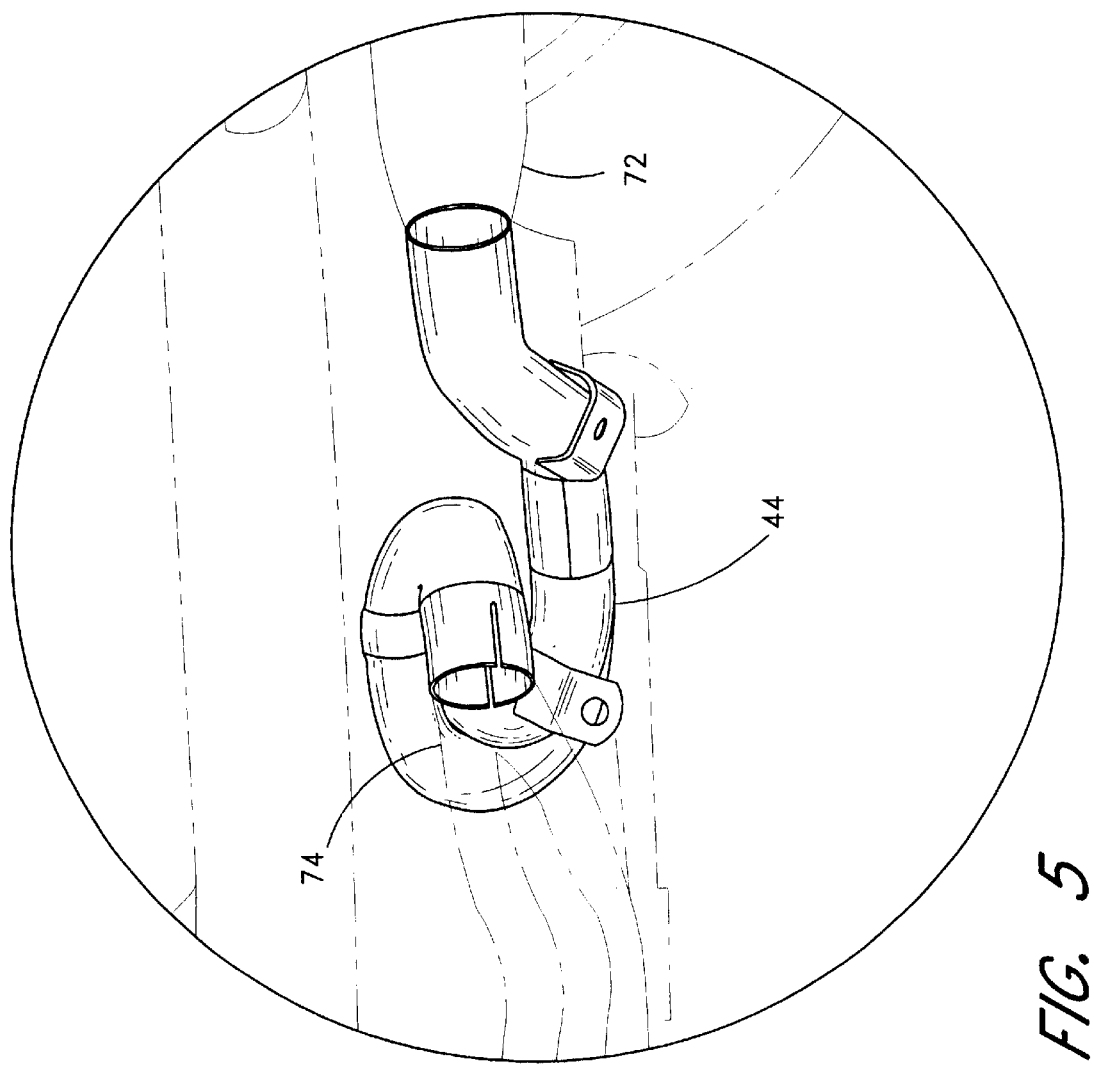
FIG. 5 is a side perspective view of a portion of the motorcycle exhaust system encompassed within line 5 of FIG. 4 and shows the crossfire assembly of the preferred embodiment of the present invention.

FIG. 5 is a side perspective view of a portion of the motorcycle exhaust system encompassed within line 5 of FIG. 4 and shows the crossfire assembly 44 of the present invention connected to one of the OEM exhaust mufflers 72 and one of two OEM collector chambers 74.

Figure 6A:
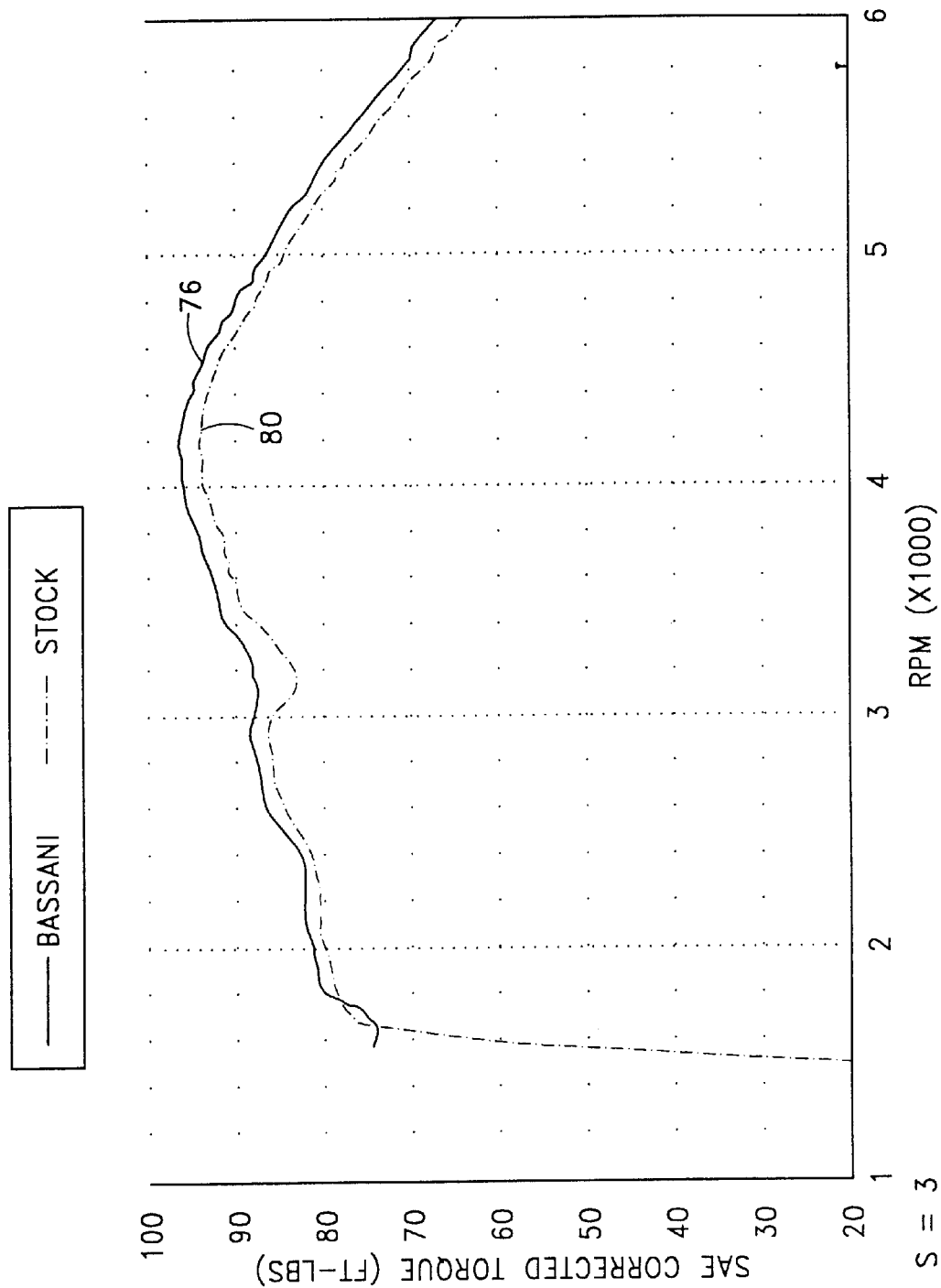
FIG. 6A is graphical view showing the torque curves of the Honda Gold Wing® engine with its OEM factory exhaust system (shown by the broken curve line labeled "stock") and the same engine with an aftermarket exhaust system constructed in accordance with the preferred embodiment of the invention (shown by the solid curve line labeled "Bassani").
Figure 6B:
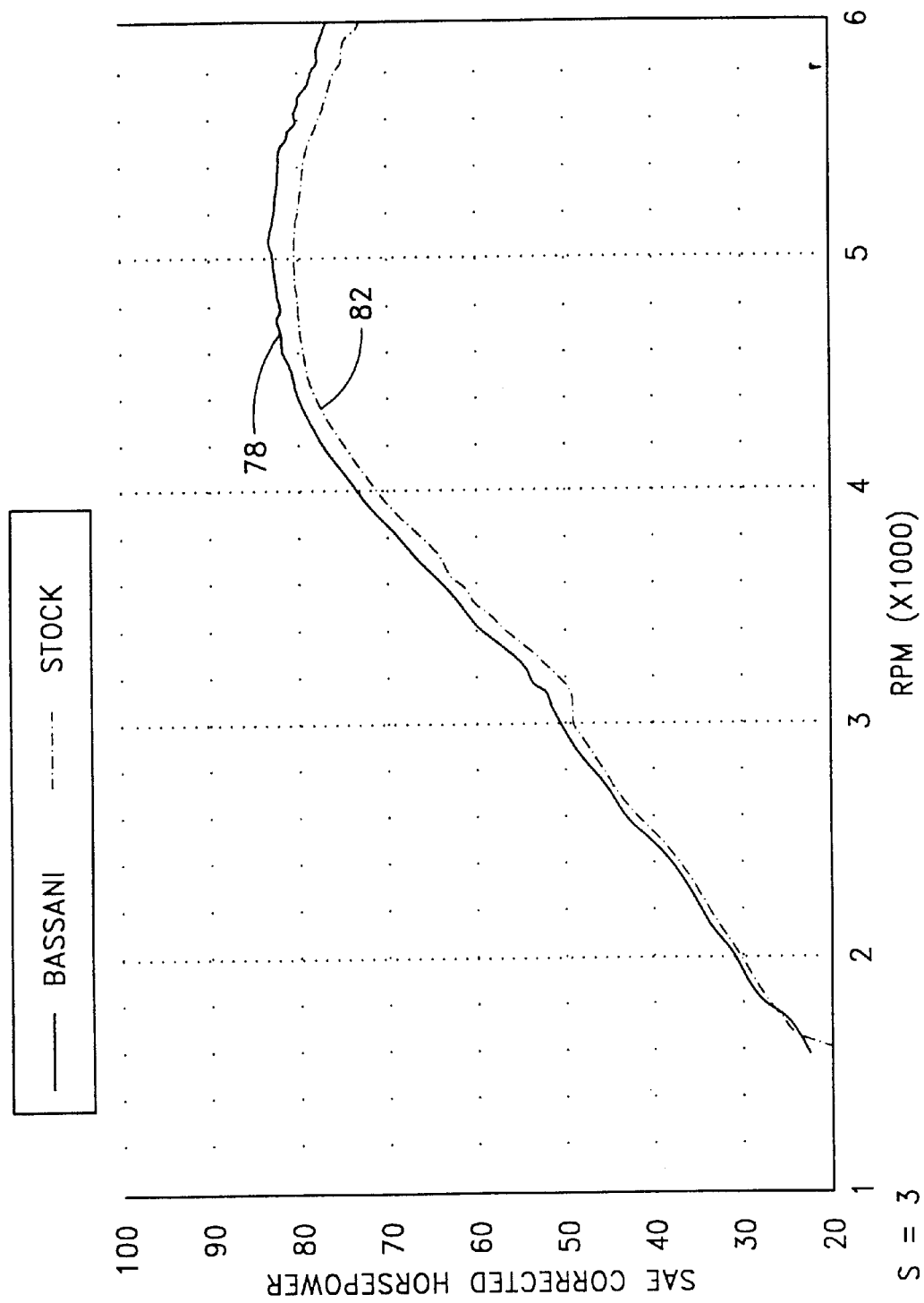
FIG. 6B is a graphical view showing the horsepower curves of the Honda Gold Wing® engine with its OEM factory exhaust system (shown by the broken curve line labeled "stock") and the same engine with an aftermarket exhaust system constructed in accordance with the preferred embodiment of the invention (shown by the solid curve line labeled "Bassani").

FIG. 6A is a graphical view showing two torque curves of the Honda Gold Wing® 70 of FIG. 4 and FIG. 6B is a graphical view showing two horsepower curves for the same engine. The solid lines 76, 78, respectively, show the torque and horsepower curves for the Honda Gold Wing® 70 using the motorcycle exhaust system constructed in accordance with the preferred embodiment of this invention. The improvement in the horsepower and torque values across the RPM range are readily apparent from these graphs when compared to the torque and horsepower curves using the stock OEM exhaust system of the Honda Gold Wing® 70 (shown respectively by dashed lines 80, 82). The increase in performance caused by the crossfire assembly 44 is even more pronounced around 3,100 RPM. As shown, around this RPM the stock OEM exhaust manifold causes a perceptible drop in torque at top-gear speeds of between 50 and 75 mph. This drop in torque translates into less top-gear roll-on power which impacts the rider's ability to pass traffic at highway speeds with nothing more than the flick of the wrist. In addition, incorporation of the crossfire assembly 44 overcomes the Honda Gold Wing® engine's lack of a strong, throaty rumble being emitted from its stock exhaust system.

Figure 7:
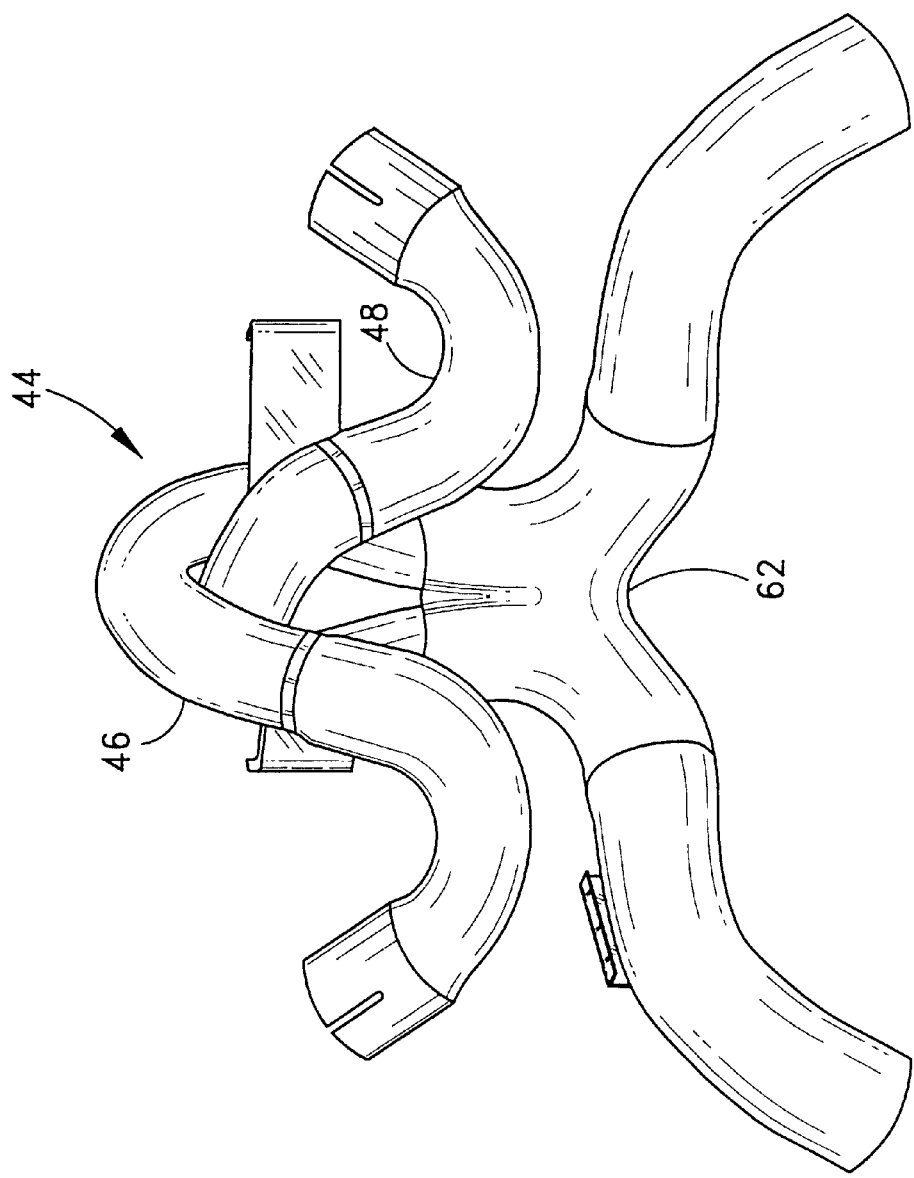
FIG. 7 is a top perspective view of the crossfire assembly shown in FIG. 2.

Referring now to FIG. 7, the crossfire assembly 44, of FIG. 2, is shown in a top perspective view with the two s-tube pipes 46, 48 forming an acute angle so that each of the two s-tube pipes 46, 48 are in line with the flow splitter 62. Thus causing an equal distribution of the pulse of exhaust gas between the two exhaust outlets 56, 58.

Figure 8:
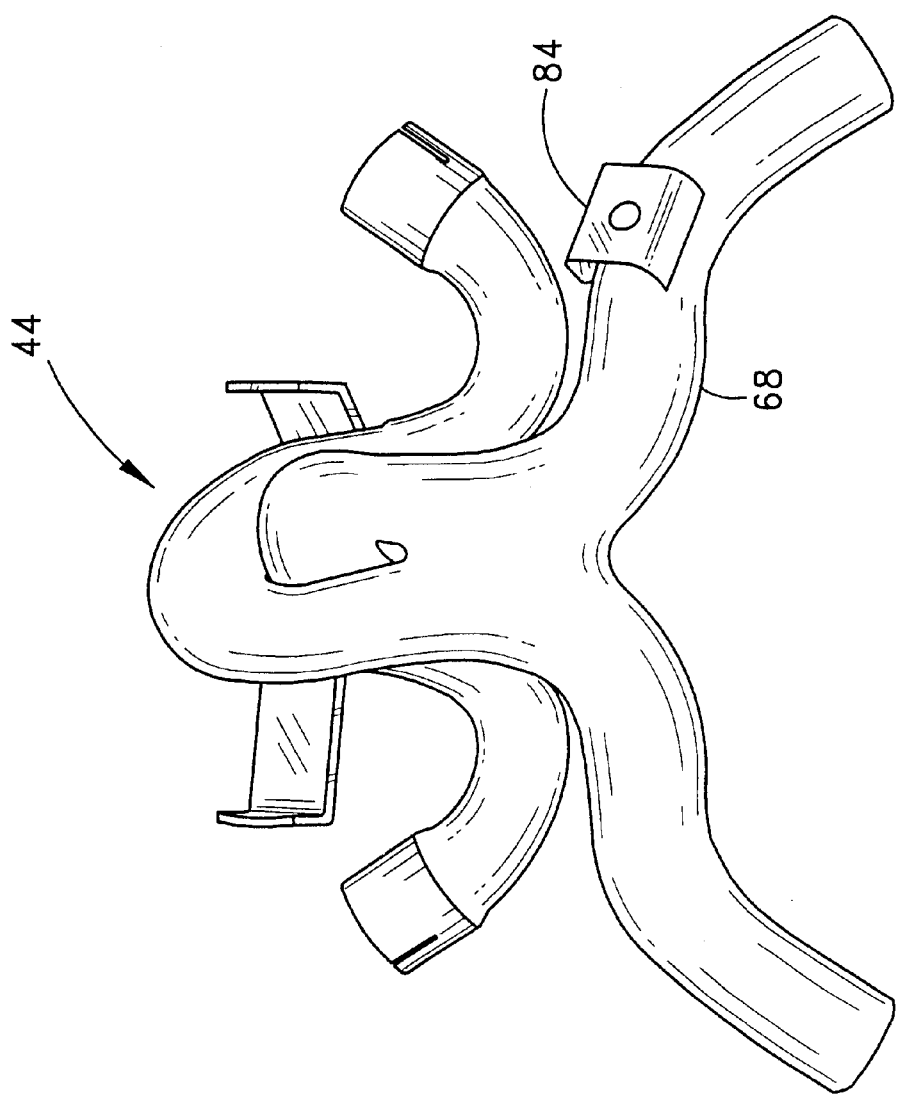
FIG. 8 is a bottom perspective view of the crossfire assembly shown in FIG. 2.

FIG. 8 is a bottom perspective view of the crossfire assembly 44, of FIG. 2, showing a bracket 84 fixedly attached to one of the two secondary exhaust pipes 68. The bracket is configured to allow the use of a stock attachment point for the installation of the crossfire assembly 44 on the Honda Gold Wing® 70.

Figure 9:
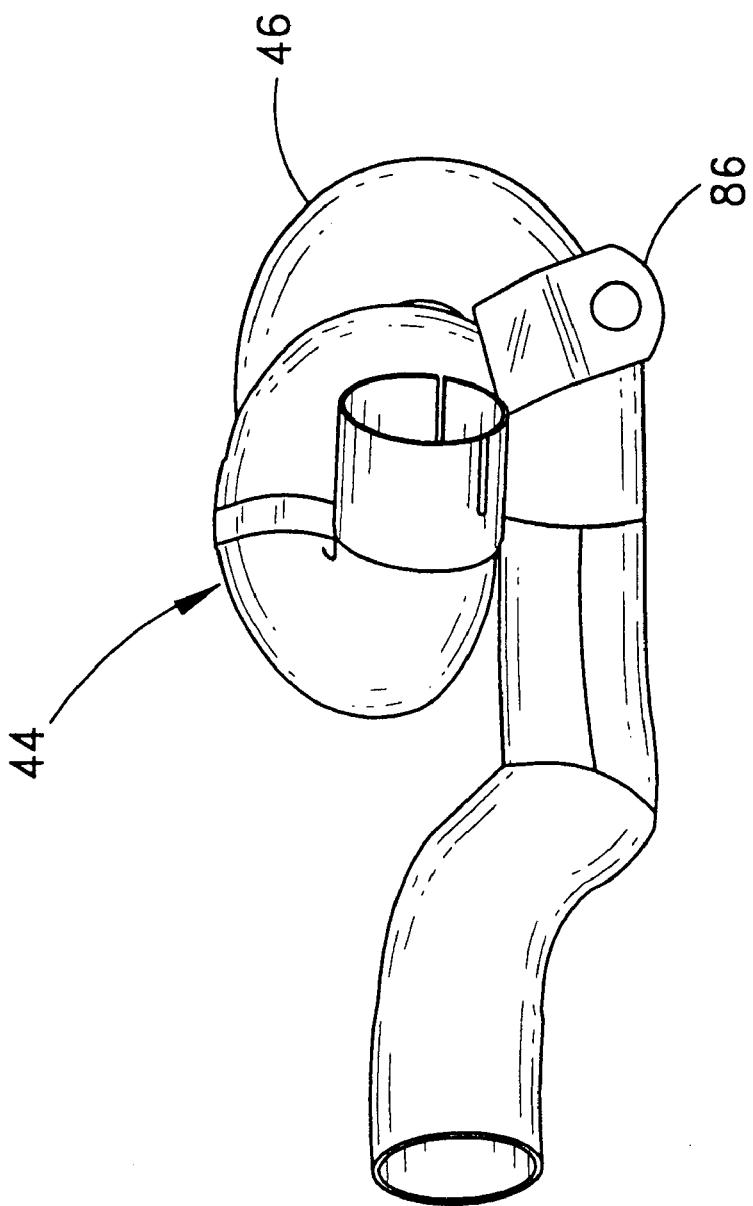
FIG. 9 is a side perspective view of the crossfire assembly of FIG. 2, taken on the opposite side of the motorcycle to that of FIG. 5.

FIG. 9 is a side perspective view of the crossfire assembly 44, of FIG. 2, taken on the opposite side of the motorcycle to that of FIG. 5 showing a bracket 86 fixedly attached to the s-tube pipe 46. The bracket is configured to allow the use of a stock attachment point for the installation of the crossfire assembly 44 on the Honda Gold Wing® 70.

Figure 10:
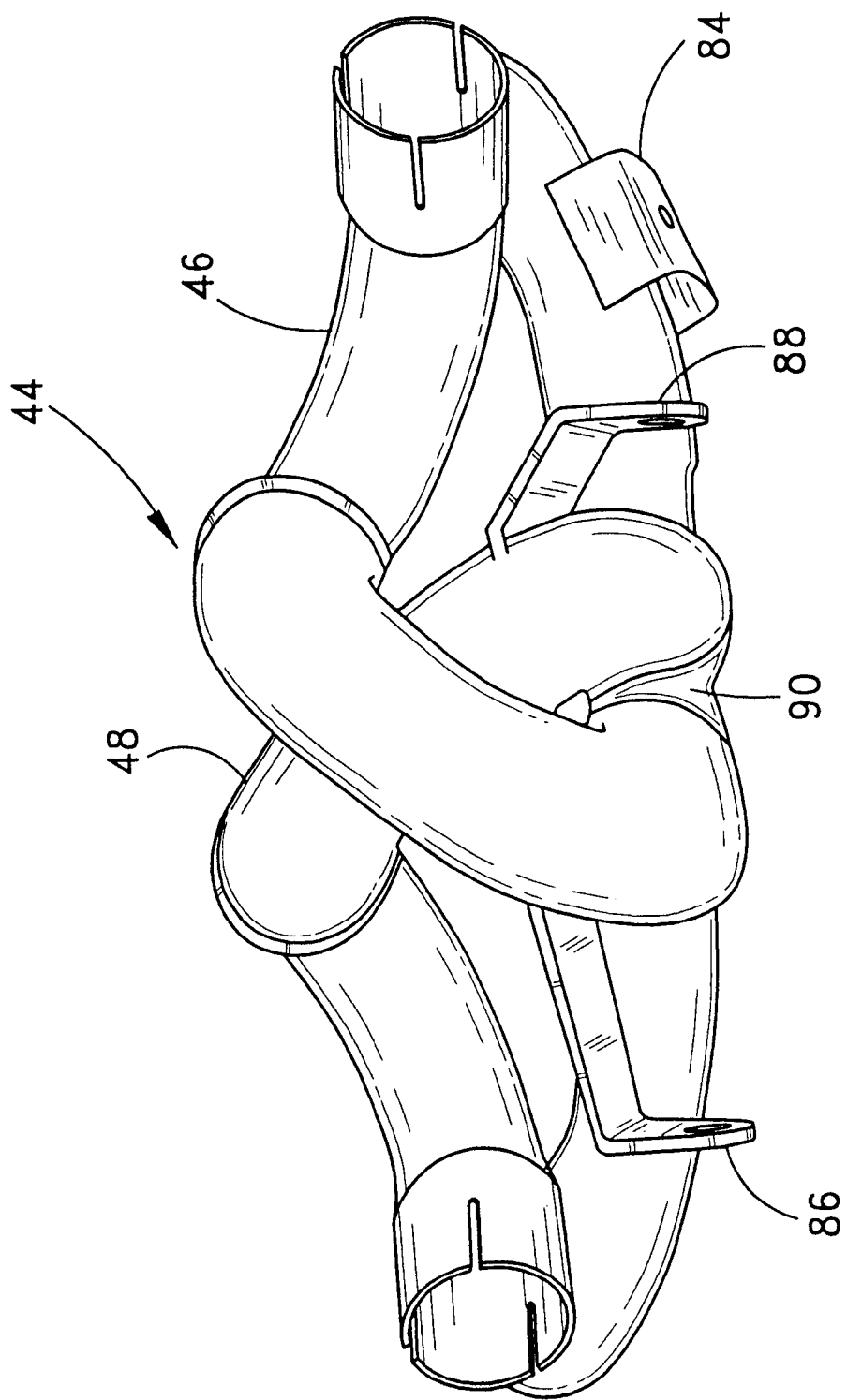
FIG. 10 is a front perspective view of the crossfire assembly shown in FIG. 2.

FIG. 10 is a front perspective view of the crossfire assembly 44 shown in FIG. 2. A bracket 88 is shown fixedly attached to the s-tube pipe 48 of the crossfire assembly 44 in FIG. 2. A triangle shaped piece 90 is shown attached at the intersection of the two s-tubes 46, 48 to seal the gas accelerator chamber 50 (not shown).

Figure 11:
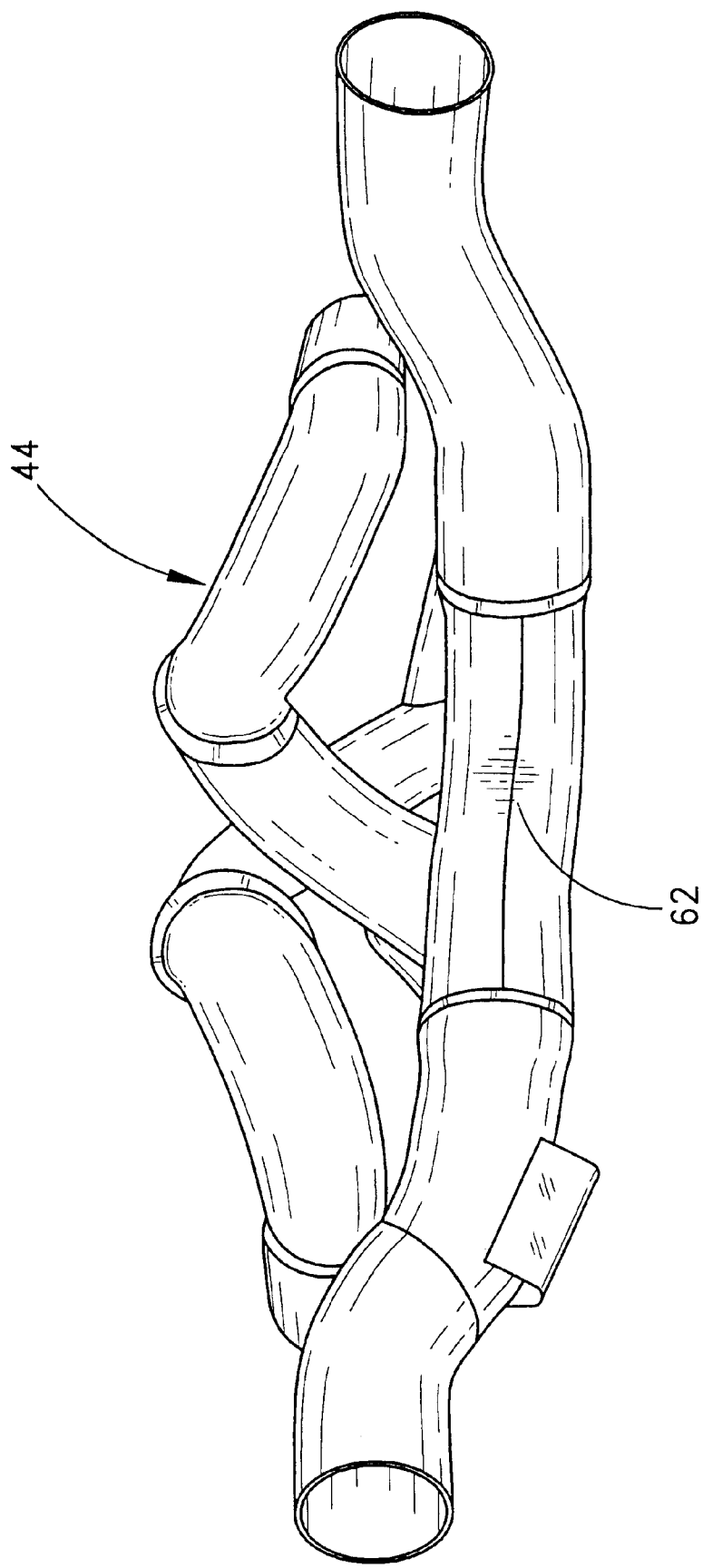
FIG. 11 is a rear perspective view of the crossfire assembly shown in FIG. 2.

FIG. 11 is a rear perspective view of the crossfire assembly 44, of FIG. 2, showing the flow splitter 62 of the gas accelerator chamber 50 (not shown).

The invention may be embodied in other specific forms without departing from its spirit or essential characteristics. The described embodiment is to be considered in all respects only as illustrative and not restrictive and the scope of the invention is, therefore, indicated by the appended claims rather than the foregoing description. All changes which come within the meaning and range of equivalency of the claims are to be embraced within their scope.

What is claimed is:

1. A method of manufacturing an exhaust system for a Honda Gold Wing® motorcycle which includes a horizontally opposed six-cylinder engine and a plurality of exhaust ports, each exhaust port in communication with a cylinder of the engine to discharge a pulse of exhaust gas, the method comprising the steps of:

forming a plurality of primary exhaust pipes, each having an inlet end and an outlet end, wherein the inlet end is configured to connect to one of the plurality of exhaust ports to scavenge the pulse of exhaust gas;

forming two collector chambers, each connected to and in flow communication with at least one outlet end of the plurality of primary exhaust pipes, wherein the two collector chambers alternate in their collection of subsequent discharges of the pulse of exhaust gas from the engine;

forming two s-tube pipes from a pair of approximately 180 degree elbow pipes attached at one of their ends in the shape of a non-coplanar s-tube, wherein each s-tube pipe is connected to and in flow communication with one of the collector chambers and crosses each other;

forming a gas accelerator chamber connected to and in flow communication with both of the s-tube pipes, wherein the gas accelerator chamber has two exhaust inlets and two exhaust outlets, wherein each exhaust inlet is aligned to direct the pulse of exhaust gas onto a flow splitter which is in the gas accelerator chamber, wherein the flow splitter is located obliquely to the flow direction of the pulse of exhaust gas to divide the pulse of exhaust gas between the two exhaust outlets, wherein the two exhaust outlets direct the distributed pulse of exhaust gas away from the flow splitter forming a low-pressure zone in the wake of the pulse of exhaust gas, and wherein the low-pressure zone preferentially travels back up the exhaust system to scavenge the subsequent pulse of exhaust gas; and forming two secondary exhaust pipes, each having an upstream end and a downstream end, wherein each upstream end is connected to and in flow communication with one of the two exhaust outlets.

2. The method of claim 1, wherein the flow splitter has a convex shape and is integral with a surface of the gas accelerator chamber.

3. A method of manufacturing an exhaust system of a multi-cylinder engine, said method comprising the steps of:

connecting a plurality of exhaust ports of the multi-cylinder engine which are equally split between a first group and a second group, wherein the first group and the second group alternate in the discharge of a pulse of exhaust gas from the engine to a gas accelerator chamber having a first exhaust inlet and a second exhaust inlet aligned to direct the pulse of exhaust gas from the first group and the second group onto a flow splitter, wherein the flow splitter is in the gas accelerator chamber and located obliquely to a direction of exhaust gas flow to distribute the pulse of exhaust gas between a first exhaust outlet and a second exhaust outlet, and wherein the first and second exhaust outlets direct the distributed pulse of exhaust gas away from the flow splitter.

4. The method of claim 3, wherein the flow splitter has a convex shape and is integral with a surface of the gas accelerator chamber.

5. A method of manufacturing an exhaust system for a Honda Gold Wing® motorcycle with a horizontally opposed six-cylinder engine, wherein the exhaust system increases the engine's performance, said method comprising the steps of:

forming a gas accelerator chamber having a first exhaust inlet and a second exhaust inlet aligned to direct a pulse of exhaust gas onto a flow splitter, wherein the flow splitter is in the gas accelerator chamber and located obliquely to a direction of exhaust gas flow to distribute the pulse of exhaust gas between a first exhaust outlet and a second exhaust outlet, and wherein the first and second exhaust outlets direct the distributed pulse of exhaust gas away from the flow splitter.

6. The method of claim 5, wherein the flow splitter has a convex shape and is integral with a surface of the gas accelerator chamber.

7. The method of claim 6, further comprising:

connecting a first downstream pipe which includes a first entrance end and a first exit end to the first exhaust outlet of the gas accelerator chamber; and connecting a second downstream pipe which includes a second entrance end and a second exit end to the second exhaust outlet of the gas accelerator chamber.

8. The method of claim 7, further comprising:

connecting a first s-tube pipe which includes a first inlet end and a first outlet end, wherein the first outlet end is connected to the first exhaust inlet of the gas accelerator chamber;

connecting a second s-tube pipe which includes a second inlet end and a second outlet end, wherein the second outlet end is connected to the second exhaust inlet of the gas accelerator chamber; and arranging the first s-tube pipe and the second s-tube pipe to cross each other.

9. The method of claim 8, further comprising:

forming each of the first and second s-tube pipes from a pair of approximately 180 degree elbow pipes attached at one of their ends in the shape of a non-coplanar s-tube.

10. The method of claim 9, further comprising:

forming the inside diameter of each of the first and second s-tube pipes to be less than or equal to the inside diameter of the first and second exhaust inlets of the gas accelerator chamber.

11. The method of claim 10, further comprising:

welding an upper half and a lower half together to form the gas accelerator chamber, wherein the upper and lower halves are symmetrical.

12. The method of claim 11, further comprising:

forming a grooved depression in each upper half and the lower half to create a cleavage between the first exhaust inlet and second exhaust inlet; wherein the combination of the cleavage, the first and second exhaust inlets form two partial circles to improve the fit of the first and second exhaust inlets with the first and second outlet ends.

* * * * *